United States Patent
Jo (10) Patent No.: US 7,657,254 B2
(45) Date of Patent: Feb. 2, 2010

(54) USER IDENTIFICATION METHOD IN MOBILE COMMUNICATION SYSTEM AND MOBILE STATION, AND MOBILE COMMUNICATION SYSTEM THEREFOR

(75) Inventor: Cheol-Ho Jo, Seoul (KR)

(73) Assignee: Samsung Electronics Co., Ltd (KR)

( * ) Notice: Subject to any disclaimer, the term of this patent is extended or adjusted under 35 U.S.C. 154(b) by 409 days.

(21) Appl. No.: 11/298,801

(22) Filed: Dec. 9, 2005

(65) Prior Publication Data
US 2006/0135123 A1   Jun. 22, 2006

(30) Foreign Application Priority Data
Dec. 17, 2004   (KR) ..................... 10-2004-0108279

(51) Int. Cl.
*H04M 11/10* (2006.01)
(52) U.S. Cl. .................... 455/413; 455/410; 455/412.1; 455/412.2; 455/428
(58) Field of Classification Search ... 455/412.1–414.1, 455/432.3–435.1
See application file for complete search history.

(56) References Cited

U.S. PATENT DOCUMENTS

| | | | | |
|---|---|---|---|---|
| 5,511,111 A | * | 4/1996 | Serbetcioglu et al. | 379/88.01 |
| 6,144,723 A | * | 11/2000 | Truchon et al. | 379/88.01 |
| 7,257,388 B2 | * | 8/2007 | Bayne | 455/406 |
| 2003/0059007 A1 | * | 3/2003 | Beyda | 379/88.19 |
| 2003/0220095 A1 | * | 11/2003 | Engelhart | 455/410 |
| 2005/0278545 A1 | * | 12/2005 | Adams et al. | 713/183 |
| 2006/0083358 A1 | * | 4/2006 | Fong et al. | 379/88.13 |
| 2006/0168539 A1 | * | 7/2006 | Hawkins et al. | 715/780 |
| 2007/0165791 A1 | * | 7/2007 | Simpson | 379/67.1 |

\* cited by examiner

*Primary Examiner*—Patrick N Edouard
*Assistant Examiner*—Dai A Phuong
(74) *Attorney, Agent, or Firm*—The Farrell Law Firm, LLP (57) ABSTRACT

A mobile station includes a voice mail password in an outgoing call message for a call, a data communication and the like. A mobile telephone switching center determines whether the voice mail password of the outgoing call message from the mobile station is consistent with the voice mail password from the voice mailing system, and provides the call service to the corresponding mobile station when they are consistent with each other. The voice mail password can be registered or changed after the user connects to the voice mailing system and is identified for the voice mail service. Therefore, the user can just merely change the voice mail password, thereby preventing unauthorized use of the mobile station.

10 Claims, 6 Drawing Sheets

USER IDENTIFICATION METHOD IN MOBILE COMMUNICATION SYSTEM AND MOBILE STATION, AND MOBILE COMMUNICATION SYSTEM THEREFOR

PRIORITY

This application claims priority under 35 U.S.C. § 119 to an application entitled "User Identification Method in Mobile Communication System and Mobile Station, and Mobile Communication System Therefor" filed in the Korean Intellectual Property Office on Dec. 17, 2004 and assigned Serial No. 2004-108279, the contents of which are incorporated herein by reference.

BACKGROUND OF THE INVENTION

1. Field of the Invention

The present invention relates generally to a user identification method in a mobile communication system and a mobile station, and a mobile communication system therefor.

2. Description of the Related Art

In general, a mobile station in a network of a mobile communication system, can only communicate with the network system after user identification (or authentication) is completed. For example, in commercially available Global System for Mobile communications (GSM), user identification is performed as follows: When a mobile station is turned on, the mobile station transmits data stored in a subscriber identification module, which is required for user identification (hereinafter, referred to as a "SIM"), to the network. The network receives the data which is transmitted from the mobile station, and checks the data required for user identification, such as registration information, charge delinquency information, a password and the like. If it is determined that the user allowable, the mobile station is identified (or authorized).

Accordingly, a technology for the user identification using Electric Serial Number (ESN), International Mobile User Identification (IMSI), and Temporary Mobile User Identification (TMSI) in a GSM mobile communication system has been developed.

However, in conventional GSM portable phones, a separate SIM card must be coupled to the Portable Phone (e.g., by sliding the SIM card into a SIM slot.) so that the portable phone can perform user identification. Therefore, when a user of the GSM portable phone loses the portable phone and/or the SIM card, the SIM card can be used or reproduced without authorization for unauthorized use.

Further, when a user loses a mobile station using other communication systems such as, for example, a code division multiple access (CDMA) system or a universal mobile telecommunications system (UMTS), unauthorized persons can use or reproduce the mobile station for unauthorized purposes and the use.

Conventionally, when a user loses a mobile station and/or a SIM card, the user can request a stop in service for the missing mobile station from the mobile station's service provider so as to prevent possible unauthorized use of the mobile station. Accordingly, when a mobile station is lost, the user, should, in order to obtain the stop in service, find a telephone number of the service center and call to the service center to request the stop in service. The service stop process can be inconvenient to the user as it may require a lengthy period until a service provider's representative answers the call. Moreover, personal information may be required which the user may not want to release for various reasons.

SUMMARY OF THE INVENTION

It is, therefore, an object of the present invention to provide a user identification method in a mobile communication system and a mobile station, and the mobile communication system therefore in which a user can be conveniently identified and when the mobile station is missing, the user can personally stop service to missing mobile station.

To achieve the above and other objects, there is provided a user identification method in a mobile communication system, the method including the steps of including a voice mail password in an outgoing call message and transmitting the voice mail password from a mobile station to a mobile telephone switching center when a user requests for an outgoing call, receiving the outgoing call message from the mobile station in the mobile telephone switching center and determining whether the voice mail password of the outgoing call message is consistent with a voice mail password of a voice mail system and determining whether a call service is provided to the mobile station depending on their consistence in the mobile telephone switching center.

In another aspect of the present invention, there is provided a user identification method in a mobile station, the method including the steps of receiving an outgoing call request from a user, including a voice mail password in an outgoing call message and transmitting the voice mail password to a mobile telephone switching center and providing a call service from the mobile telephone switching center when the voice mail password of the outgoing call message is consistent with a voice mail password of a voice mailing system.

The inventive mobile station includes the voice mail password in the outgoing call message for a call, a data communication and the like. Accordingly, the mobile telephone switching center determines whether the voice mail password of the outgoing call message from the mobile station is consistent with the voice mail password from the voice mailing system, and provides the call service to the corresponding mobile station only when they are consistent with each other. The voice mail password can be registered or changed after the user connects to the voice mailing system and the user is identified for the voice mail service. Therefore, in order to prevent an unauthorized use of the mobile station the user can conveniently change the voice mail password.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 1:
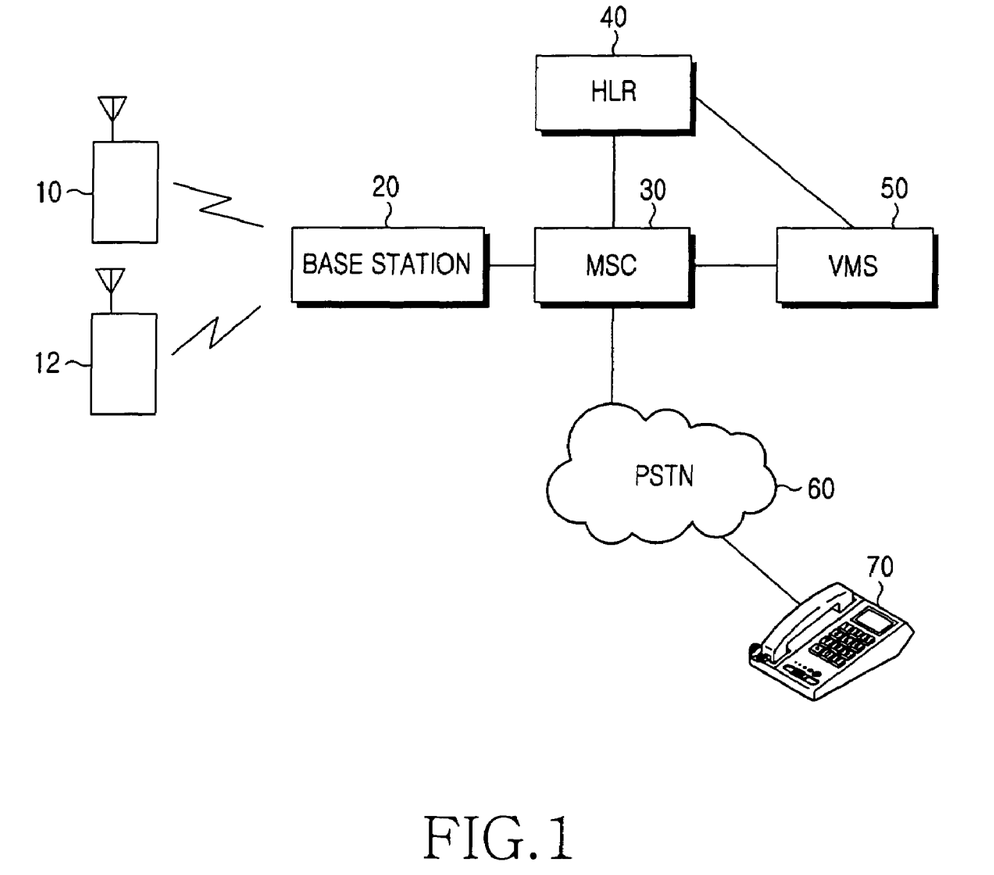
FIG. 1 is a block diagram illustrating a construction of a mobile communication system according to the present invention.

FIG. 1 is a block diagram illustrating a construction of a mobile communication system according to the present invention. The mobile communication system includes a base station 20. The base station 20 includes a base station transceiver (not shown) and a base station controller (not shown). The base station 20 is communicates wirelessly with mobile stations 10 and 12 of a corresponding cell region to provide a mobile communication service. The base station 20 is connected to a mobile switching center 30. The mobile switching center 30 performs a call connection/switching function to process an incoming/outgoing call to/from the mobile stations 10 and 12. The mobile switching center 30 performs a network interworking function with another mobile telephone switching center and/or a public switched telephone network (PSTN) 60.

The mobile communication system includes a voice mailing system (VMS) 50 for providing a voice mail service. In the voice mail service, a voice message is stored for later use such as when a called party cannot or does not answer, or is on the line, etc., so that the calling party can listen to the voice message. In the voice mail service according to an exemplary embodiment of the mobile communication system of the present invention, when a voice message is stored in a user's voice mail, the user is notified that the voice message has been stored, so that the user can check the stored voice message.

In a detailed description, a mobile switching center (MSC) 30, a home location register (HLR) 40 and a voice mailing system (VMS) 50 are interworked with one another while the voice mail service is provided for the user. First, when the user for the voice mail service is in a call inability state (e.g., when the mobile station is turned off, cannot receive wireless service, is on the line and is therefore busy and/or does not answer an incoming phone call,), a calling party connecting through the mobile switching center 30 can optionally leave (i.e., store) a voice message in the VMS 50. When a voice message is left in the VMS 50, the user returns to a normal standby state (e.g., when a user's mobile station receives wireless service from a base station), the VMS 50 sends a short message to the user to notify the user of arrival of the voice message. After that, the corresponding user is notified of the arrival of the voice message and can request to be connected to the VMS 50 through the mobile switching center 30. The user can input a voice mail password and the like as required according to an announcement of the VMS 50 to listen to the voice message stored in his/her voice mail. The VMS 50 determines whether the user's inputting voice mail password is consistent with a registered password.

The voice mail password can be registered or changed after the user is connected to the VMS 50 and identified (or authenticated) for the voice mail service. According to the present invention, the voice mal password is used to identify (or authenticate) the user for the mobile communication service. In this manner, when mobile stations 10 and/or 12 transmit an outgoing call request message for a call, a data communication or the like, the corresponding mobile station 10 and/or 12 transmits the corresponding mobile station's user's voice mail password to the mobile switching center 30 through the base station 20. When the mobile switching center 30 receives the outgoing call message for the call, the data communication or the like from the mobile stations 10 and/or 12, the mobile switching center 30 requests a corresponding user's voice mail password of the VMS 50. When the mobile switching center 30 receives the corresponding user's voice mail password from the VMS 50, it determines whether the voice mail password included in the outgoing call message is consistent with the voice mail password received from the VMS 50. If it is determined that they are consistent with each other, the mobile switching center 30 provides call services for the requesting mobile stations 10 and/or 12. If it is determined that they are not consistent with each other, the mobile switching center 30 transmits a call termination message to the mobile stations 10 and 12 through the base station 20. The call termination message can mean that the user identification (or authentication) fails. In general, the call termination message includes a call termination cause. According to the present invention, the call termination message includes a user identification failure as the call termination cause. The mobile stations 10 and 12 can selectively inform the user of the user identification failure.

As described above, the voice mail password can be registered or changed after the user is connected to the VMS 50 and identified for the voice mail service. If the user loses his/her mobile station, 10, the user can use another mobile station, for example, mobile station 12, or a telephone set 70 to connect to the VMS 50 and change the voice mail password. Accordingly, when unauthorized use is suspected (for example, when the mobile station is missing or lost), the user can connect to the VMS 50 and change the voice mail password, thereby preventing an unauthorized use of the missing mobile station. Hereinafter, a user identification method according to the present invention will be described with reference to a message flowchart of FIG. 2.

Figure 2:
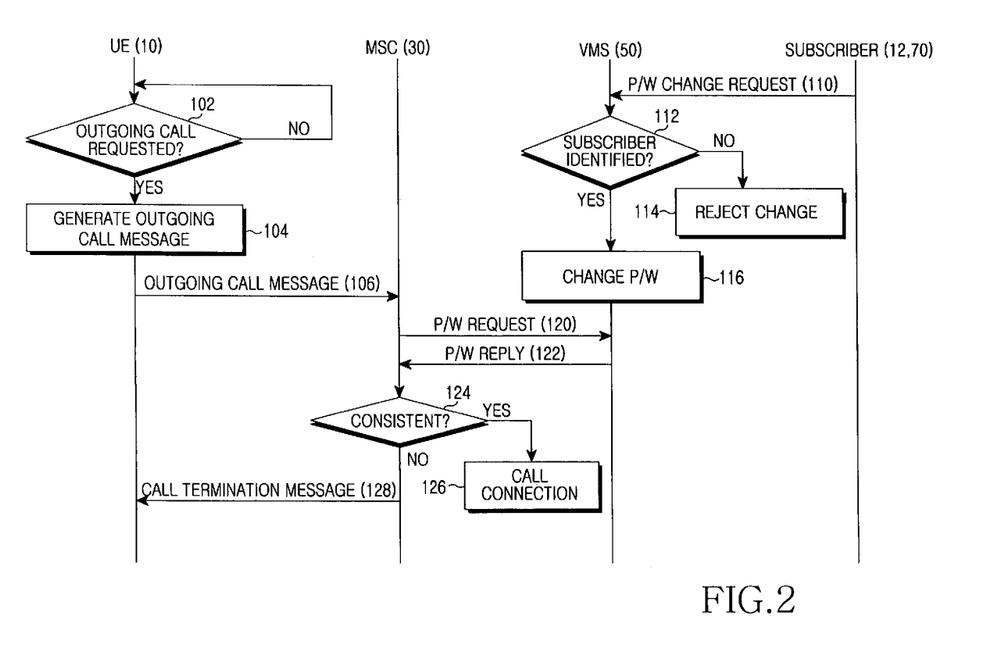
FIG. 2 is a message flow diagram illustrating a user identification method in a mobile communication network according to an embodiment of the present invention.

FIG. 2 is the message flowchart illustrating the user identification method in the mobile communication network according to an embodiment of the present invention. If the mobile station 10 is missing etc., the user connects to the VMS 50 using another mobile station 12 through the telephone set 70 or a computer to request for a password change in Step 110. Accordingly, the VMS 50 determines whether the user is identified in Step 112. This process for the password change is performed by determining whether the user's inputting password is consistent with the previously registered voice mail password. Alternatively, in order to determine in a different fashion whether the user is identified, user voice recognition and the like can be used. Next, if it is determined that the user requesting for the password change is identified in Step 112, the VMS 50 changes the voice mail password in Step 116. Otherwise, the VMS 50 rejects the password change in step 114.

Meanwhile, in Step 102, the mobile station 10 determines whether a user requests an outgoing call using the mobile station 10. Here, for exemplary purposes, the outgoing call request includes requests for all of the mobile communication services including the call, the data communication, a short message service (SMS) and the like. If the user of the mobile terminal 10 requests an outgoing call in Step 102, the mobile station 10 generates the outgoing call message including a user password in Step 104. The user password is represented using a reserved field of the outgoing call message or an unused bit. The user password is the voice mail password. If the user stores the voice mail password in the mobile station, the mobile station includes the voice mail password in the outgoing call message when generating the outgoing call message. Next, the mobile station 10 transmits the outgoing call message to the mobile switching center 30 in Step 106. If the mobile switching center 30 receives the outgoing call message for the call, the data communication or the like from the mobile station 10, it requests the corresponding user's voice mail password from the VMS 50 in Step 120. The mobile switching center 30 then receives the corresponding user's voice mail password from the VMS 50 in Step 122, and determines whether the password included in the outgoing call message is consistent with the voice mail password received from the VMS 50 in Step 124. If it is determined that they are consistent with each other, the mobile switching center 30 provides the call service for the mobile station 10 in Step 126. Otherwise, the mobile switching center 30 transmits the call termination message to the mobile station 10 in Step 128. Accordingly, when unauthorized use is suspected (for example, when the mobile station is missing), the user can connect to the VMS 50 to change the voice mail password, thereby preventing unauthorized use of the mobile station.

Hereinafter, an operation of the mobile telephone switching center according to the present invention will be described with reference to FIG. 3.

Figure 3:
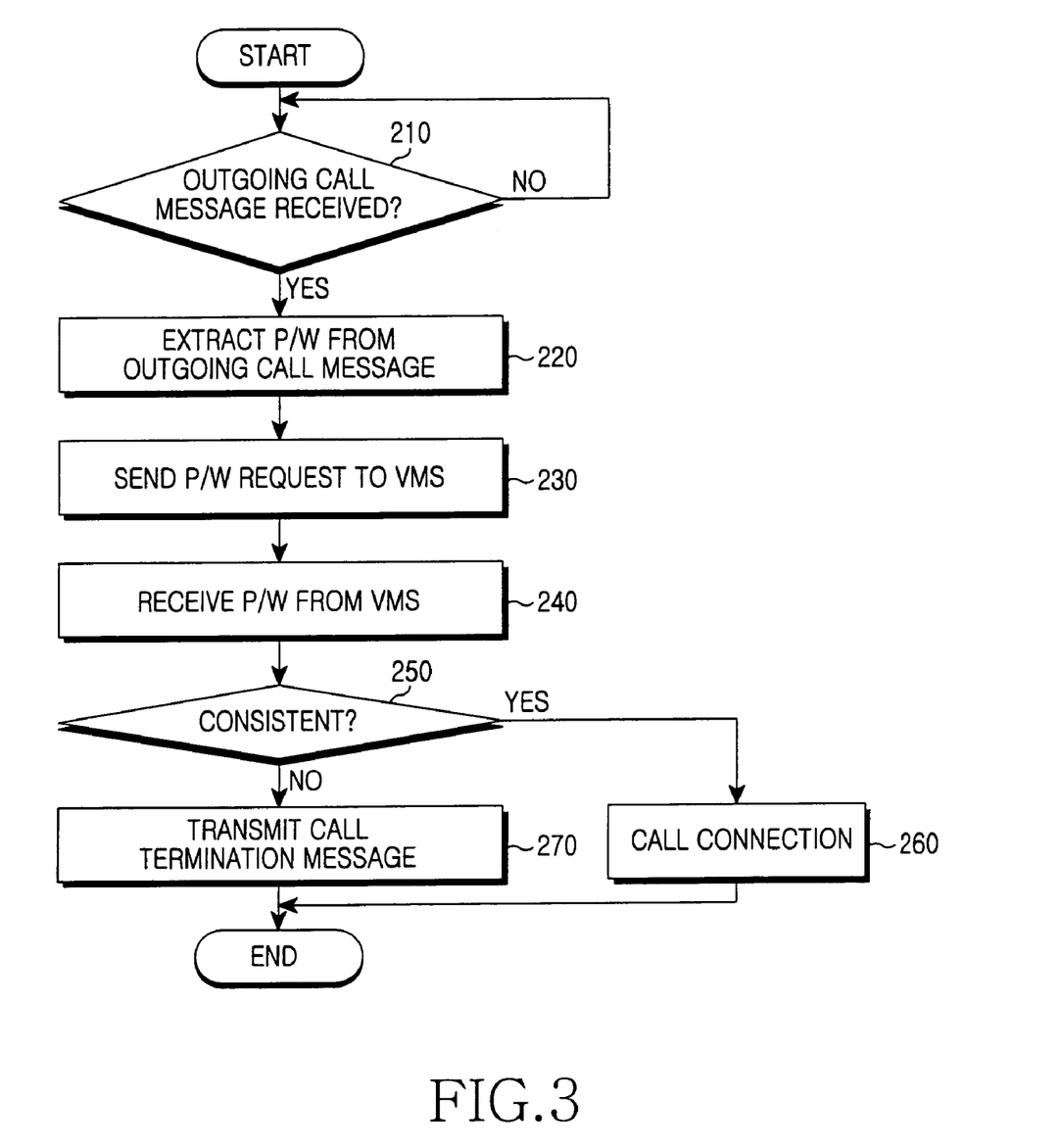
FIG. 3 is a flowchart for user identification in a mobile telephone switching center according to an embodiment of the present invention.

FIG. 3 is a control flowchart for the user identification in the mobile telephone switching center according to an embodiment of the present invention. In Step 210, it is determined whether the mobile switching center 30 receives the outgoing call message for the call, the data communication or the like from the mobile stations 10 and/or 12. If it is determined that the mobile switching center 30 receives the outgoing call message from the mobile stations 10 and/or 12, the mobile switching center 30 extracts the password from the outgoing call message in Step 220. After that, the mobile switching center 30 requests the voice mail password of the VSM 50 in Step 230, and receives the voice mail password from the VMS 50 in step 240. In Step 250, the mobile switching center 30 determines whether the password included in the outgoing call message is consistent with the voice mail password received from the VMS 50. If it is determined that they are consistent with each other, the mobile switching center 30 provides the call service for the mobile stations 10 and/or 12 in Step 260. Otherwise, the mobile switching center 30 transmits the call termination message to the mobile stations 10 and/or 12 in Step 270. The mobile switching center 30 can include the user identification failure as the call termination cause in the call termination message. Hereinafter, a construction of the mobile station according to the present invention will be described with reference to FIG. 4.

Figure 4:
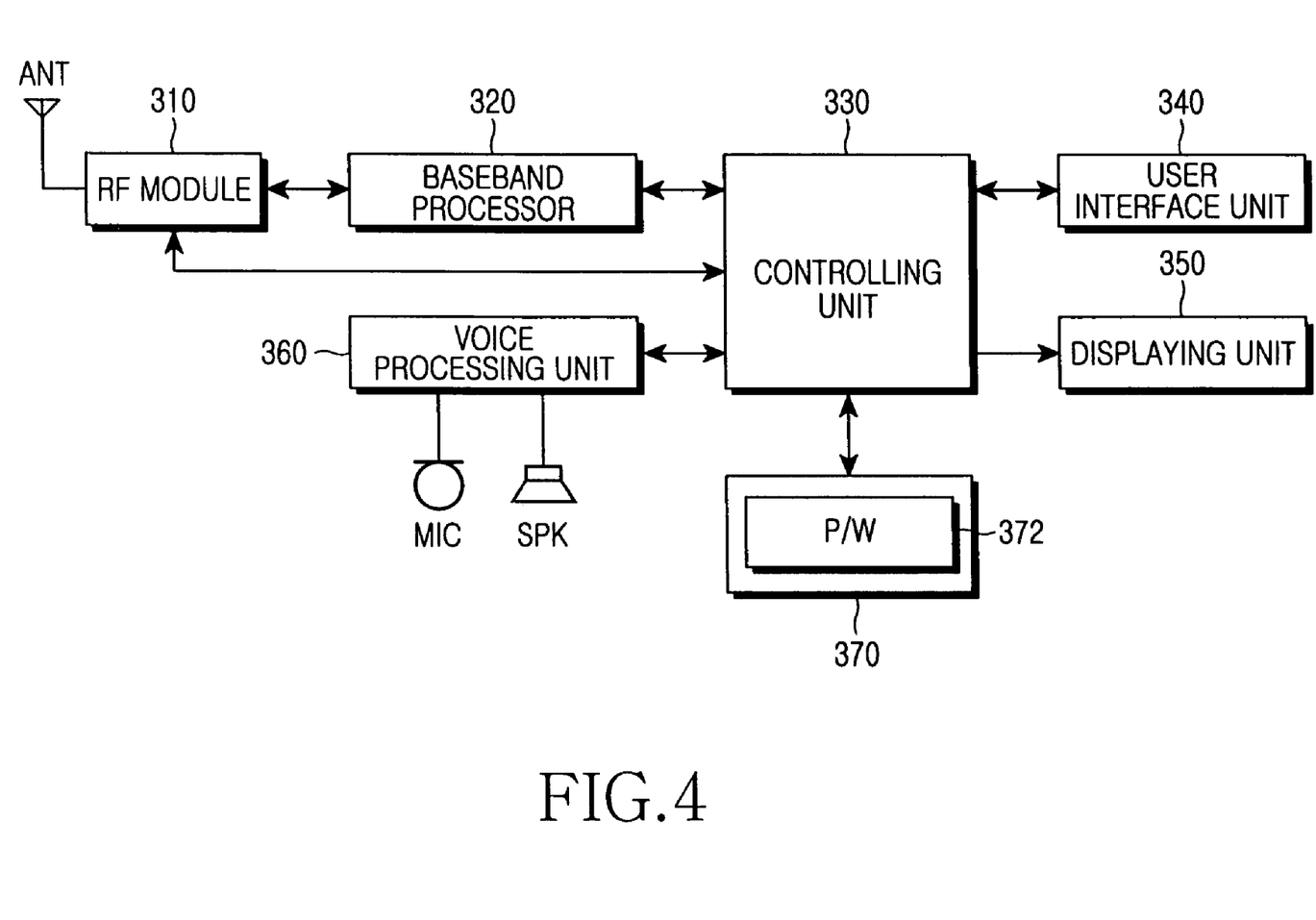
FIG. 4 is a block diagram illustrating a construction of a mobile station according to a preferred embodiment of the present invention.

FIG. 4 is a diagram illustrating the construction of the mobile station according to a preferred embodiment of the present invention. According to an exemplary embodiment of the present invention, the mobile station 10 includes a radio frequency (RF) module 310, a baseband processor 320, a controller 330, a user interface 340, a display 350, a voice processor 360, and a memory unit 370.

The controller 330 performs a general control operation of the mobile station 10. When the user requests for the outgoing call according to the present invention, the controller 330 generates the outgoing call message including the user password. The user password is represented using the reserved field of the outgoing call message or an unused bit. The user password is stored in the memory unit 370. The user password can be set by the user to prevent unauthorized use of the mobile station 10, or can be separately registered by the user as a VMS password.

The memory unit 370 includes a read only memory (ROM), a random access memory (RAM) and the like for storing a plurality of programs and information. The plurality of programs and information are required when the mobile station 10 is controlled for operation. As described above, the memory unit 370 stores the user password 372 to be included in the outgoing call message.

The RF module 310 transmits and receives an RF signal to and from the base station through an antenna. The RF module 310 receives the RF signal through the antenna and converts the received RF signal into an intermediate frequency (IF) signal to output the converted IF signal to the baseband processor 320. Moreover, the RF module 310 receives an IF signal from the baseband processor 320 and converts the received IF signal into an RF signal. The baseband processor 320 functions as baseband analog ASCII (American Standard Code for Information Interchange) (BAA) interfacing between the controller 330 and the RF module 310. The baseband processor 320 receives a baseband digital signal from the controller 330 and converts the received baseband digital signal into an analogue IF signal to apply the converted analogue IF signal to the RF module 310. The baseband processor 320 receives an analogue IF signal from the RF module 310 and converts the received analogue IF signal into a baseband digital signal to apply the converted baseband digital signal to the controller 330. The voice processor 360 receives voice data through the RF module 310 and converts the received voice data into an audible sound to output the converted audible sound through a speaker under the control of the controller 330. The voice processor 360 receives voice data through a microphone and converts the received voice data into an electric signal to provide the electric signal to the controller 330. The display 350 displays a variety of messages under the control of the controller 330. The display 350 can include a liquid crystal display (LCD), a thin film transistor (TFT), an organic electroluminescence (organic EL) or the like. The user interface 340 includes a plurality of numeric keys and function keys. The user interface 340 outputs key input data corresponding to a key pressed by the user, to the controller 330. Hereinafter, an operation of the mobile station according to the exemplary embodiment of the present invention will be described with reference to FIG. 5.

Figure 5:
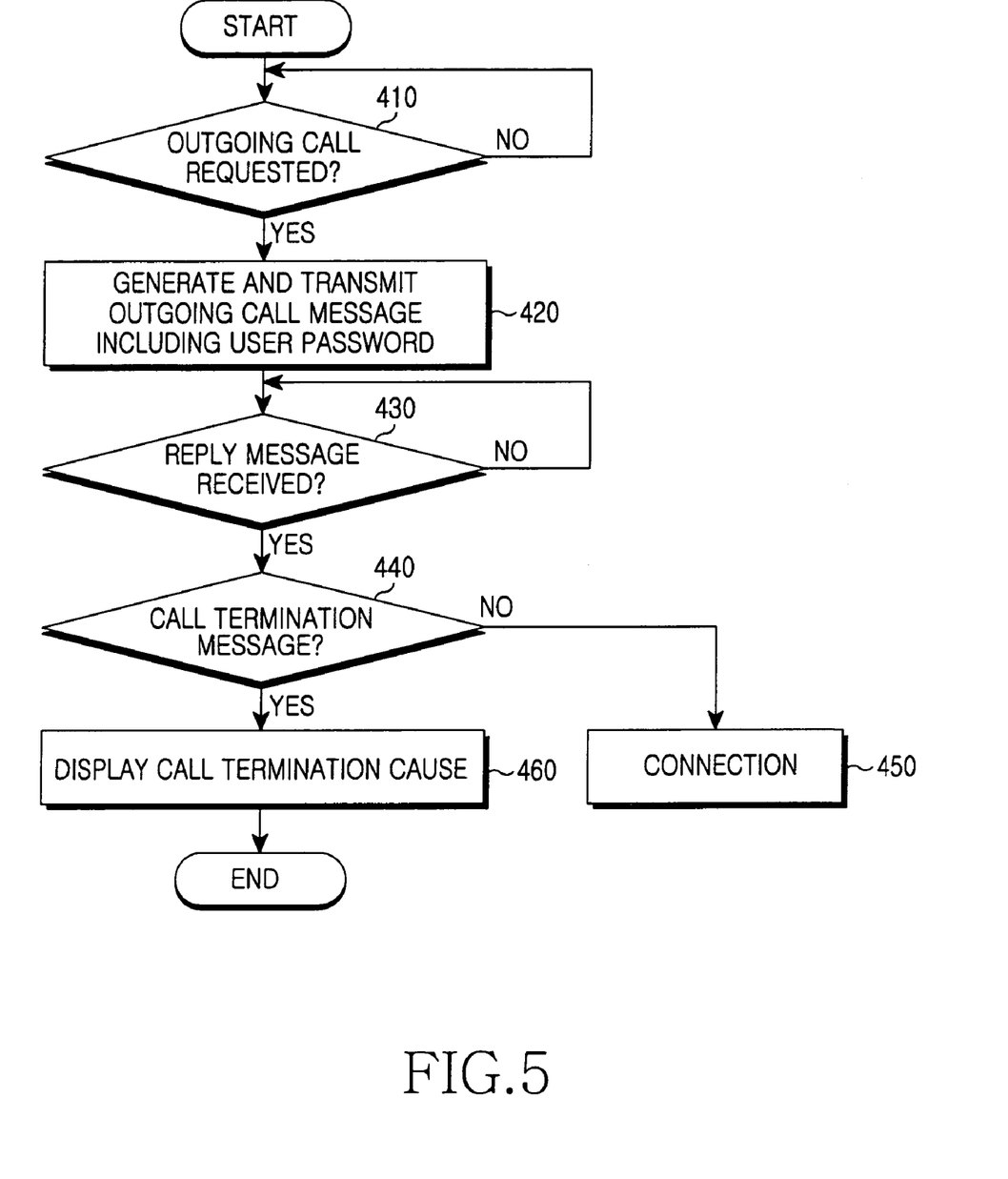
FIG. 5 is a flowchart for user identification in a mobile station according to an embodiment of the present invention.

FIG. 5 is a control flowchart for the user identification in the mobile station according to the embodiment of the present invention. Referring to FIG. 5, the mobile station 10 determines whether the user requests an outgoing call in Step 410. The exemplary outgoing call request includes the request for of the mobile communication services including the call, the data communication, the SMS message and the like. If the user requests the outgoing call, the mobile station 10 generates the outgoing call message including the user password in Step 420. The user password is represented using the reserved field of the outgoing call message or the unused bit. According to the exemplary embodiment of the present invention, the mobile station 10 transmits the user password on a reserve of a mobile identity field, to the base station 20.

Next, it is determined whether the mobile station 10 receives a reply message from the base station 20 in Step 430. If the mobile station 10 receives the reply message from the base station 20, it determines whether the reply message is the call termination message in Step 440. Otherwise, the mobile station 10 performs a call process through the mobile communication network in Step 450. If the reply message is the call termination message, the mobile station 10 displays the call termination cause on the display 350 in Step 460.

Figure 6:
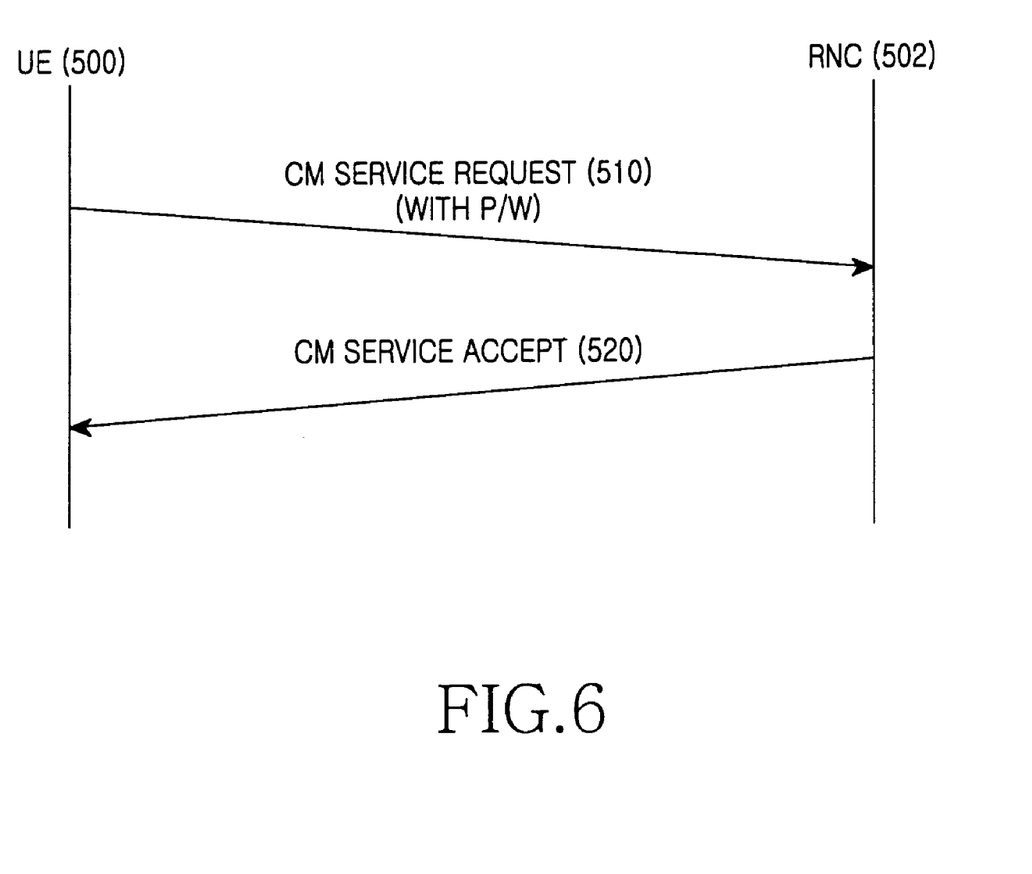
FIG. 6 is a message flow diagram illustrating a user identification method according to the present invention applied to universal mobile telecommunications system (UMTS).

Hereinafter, an example of the user identification method according to the present invention applied to universal mobile telecommunications system (UMTS) will be described with reference to FIG. 6. FIG. 6 is a message flow diagram illustrating the user identification method according to the present invention applied to the UMTS. In the UMTS of FIG. 6, a user equipment (UE) 500 corresponds to the mobile station, and a radio network controller (RNC) 502 corresponds to the mobile telephone switching center.

First, if the user requests the outgoing call, the UE 500 transmits a control management (CM) service request message, which is the outgoing call message, to the RNC 502 in Step 510. The UE 500 includes the user password in a mobile identity field of the CM service request message. The mobile identity field has a variable size of two bytes to nine bytes. For example, the mobile identity field requires fifteen bits when international mobile station identity (IMSI) is used as a mobile identity. The mobile identity field requires four bytes when temporary mobile station identity (TMSI) is used as the mobile identity. Or, the mobile identity field requires fifteen bits when international mobile equipment identification (IMEI) is used as the mobile identity. That is, the mobile identity field uses four bytes to the maximum and accordingly, has five bytes in reserve. Accordingly, the UE 500 carries the user password (that is, the voice mail password) on the reserve of the mobile identity field of the CM service request message. It is determined whether the user password included in the CM service request message is consistent with the voice mail password provided from the VMS. If it is determined that they are consistent with each other, the RNC 502 transmits a CM service accept message to the UE 500 in Step 520.

According to the present invention, the mobile station includes the voice mail password in the outgoing call message for the call, the data communication, or the like. The mobile telephone switching center determines whether the voice mail password included in the outgoing call message provided from the mobile station is consistent with the voice mail password provided from the VMS. Only when it is determined that they are consistent with each other, the call service is provided to the corresponding mobile station. Accordingly, when the mobile station or the user identification module (SIM) of the mobile station is missing, the user can just merely change the voice mail password, thereby preventing the possible unauthorized use of the mobile station. In the base station, the user identification method according to the present invention can be embodied without any additional costs required by a hardware change. Therefore, a unique voice mail service individualized to the user can be provided.

While the invention has been shown and described with reference to a certain preferred embodiment thereof, it will be understood by those skilled in the art that various changes in form and detail may be made therein without departing from the spirit and scope of the invention as defined by the appended claims. For example, the present invention is applicable to a variety of mobile communication systems including code division multiple access (CDMA), Global System for Mobile communications (GSM) and the like.

What is claimed is:

1. A user identification method in a mobile communication system, the method comprising the steps of:
   including a voice mail password in an outgoing call message by a mobile station and transmitting the voice mail password from the mobile station to a mobile telephone switching center when a user requests an outgoing call to another mobile station or a telephone set;
   receiving the outgoing call message from the mobile station in the mobile telephone switching center;
   determining whether the voice mail password of the outgoing call message is consistent with a voice mail password of a voice mailing system and determining, in the mobile telephone switching center, whether a call connection from the mobile station to the another mobile station or the telephone set is to be provided to the mobile station based on the determination; and
   when it is determined that the voice mail password of the outgoing call message is consistent with the voicemail password of the voice mailing system, connecting the mobile station to the another mobile station or the telephone system without establishing a connection between the mobile station and the voice mailing system.

2. The method of claim 1, further comprising the step of requesting and receiving the user's voice mail password of the voice mailing system in the mobile telephone switching center.

3. The method of claim 1, wherein when the mobile communication system is a UMTS (Universe Mobile Telecommunications System), in the step of including the voice mail password in the outgoing call message, the voice mail password is included in a mobile identity field of a CM (Control Management) service request message.

4. The method of claim 1, further comprising the step of transmitting a call termination message from the mobile telephone switching center to the mobile station when it is determined that the voice mail password of the outgoing call message is not consistent with the voice mail password of the voice mailing system.

5. The method of claim 1, further comprising the step of reading, by the mobile station, the voice mail password previously stored in the mobile station, wherein the mobile station automatically includes the read-out voice mail password in the outgoing call message when the user requests the outgoing call.

6. A mobile communication system for user identification, the system comprising:
   a mobile station for including a voice mail password in an outgoing call message and transmitting the voice mail password to a mobile telephone switching center when a user requests an outgoing call to another mobile station or a telephone set; and
   the mobile telephone switching center for determining whether the voice mail password of the outgoing call message is consistent with a voice mail password of a voice mailing system and determining whether a call connection from the mobile station to the another mobile station or the telephone set is provided to the mobile station depending on the consistency when the mobile telephone switching center receives the outgoing call message from the mobile station,
   wherein when it is determined that the voice mail password of the outgoing call message is consistent with the voice mail password of the voice mailing system, the mobile telephone switching center connects the mobile station to the another mobile station or the telephone set without establishing a connection between the mobile station and the voice mailing system.

7. The system of claim 6, wherein the mobile telephone switching center transmits a call termination message to the mobile station when the voice mail password of the outgoing call message is not consistent with the voice mail password of the voice mailing system.

8. The system of claim 6, wherein the mobile telephone switching center requests and receives the user's voice mail password from the voice mailing system.

9. The system of claim 6, wherein when the mobile communication system is a Universal Mobile Telecommunications System (UMTS), the mobile station includes the voice mail password in a mobile identity field of a Control Management (CM) service request message.

10. The system of claim 6, wherein the mobile station reads the voice mail password from a memory, and the mobile station automatically includes the read-out voice mail password in the outgoing call message when the user requests the outgoing call.

* * * * *

UNITED STATES PATENT AND TRADEMARK OFFICE
CERTIFICATE OF CORRECTION

PATENT NO.         : 7,657,254 B2                                     Page 1 of 1
APPLICATION NO. : 11/298801
DATED              : February 2, 2010
INVENTOR(S)        : Cheol-Ho Jo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Thirtieth Day of November, 2010

David J. Kappos
*Director of the United States Patent and Trademark Office*